United States Patent [19]

Murata

[11] Patent Number: 5,506,692
[45] Date of Patent: Apr. 9, 1996

[54] IMAGE HANDLING APPARATUS HAVING FILE SYSTEM EMULATION MEANS

[75] Inventor: Kazuyuki Murata, Tsuzuki, Japan

[73] Assignee: Matsushita Electric Industrial Co., Ltd., Kadoma, Japan

[21] Appl. No.: 259,530

[22] Filed: Jun. 14, 1994

Related U.S. Application Data

[62] Division of Ser. No. 36,028, Mar. 23, 1993.

[30] Foreign Application Priority Data

Apr. 9, 1992 [JP] Japan .................................. 4-088541
Aug. 7, 1992 [JP] Japan .................................. 4-211102

[51] Int. Cl.⁶ ........................... H04N 1/00; H04N 1/21; G06F 3/00; G06F 9/455; G06F 13/00
[52] U.S. Cl. .................... 358/442; 358/444; 395/112; 395/115; 395/500; 395/828; 395/830; 395/882; 395/883; 395/892
[58] Field of Search ................... 358/442, 468, 358/444, 296; 395/500, 275, 112, 114, 115, 828, 830, 882, 883, 892

[56] References Cited

U.S. PATENT DOCUMENTS 5,088,033  2/1992  Binkley et al. .................. 395/500

OTHER PUBLICATIONS

Operating Systems: Design and Implementation, Andrew S. Tanenbaum, 1987, pp. 299–308.

Primary Examiner—Scott A. Rogers
Attorney, Agent, or Firm—Ratner & Prestia

[57] ABSTRACT

An image forming apparatus which is used with an external host computer. The image forming apparatus includes an interface for connecting the image forming apparatus to the external host computer. The image forming apparatus further includes a file system emulator which emulates a file system contained in the disk storage apparatus of the external host computer. The file system emulator makes the image forming apparatus look like the disk storage apparatus to the external host computer connected to the image forming apparatus to transfer images from the external host computer to the image forming apparatus via the interface device.

10 Claims, 7 Drawing Sheets

Fig. 4

```
#SCANNER PARAMETER FILE EXAMPLE
# AREA PARAMETER(inch)
# X,Y,XL,YL
1.2
2.4
5.5
6.3

#ZOOMING PARAMETER(%) XZ,YZ
100
150

#IMAGE PROCESSING PARAMETER
#       SIMPLE BI-LEVEL IMAGE                   ->0
#       BI-LEVEL COMPRESSION IMAGE(MH)          ->1
#       BI-LEVEL COMPRESSION IMAGE(MR)          ->2
#       BI-LEVEL COMPRESSION IMAGE(MMR)         ->3
#       ERROR DIFFUSION BI-LEVEL IMAGE          ->4
#       8BITS GRAY SCALE IMAGE                  ->5
#       8BITS GRAY SCALE COMPRESSION IMAGE      ->6
1

#GAMMA TRANSFER PARAMETER
#       LINEAR          ->0
#       DENSITY         ->1
#       DATE SETTABLE   ->2
2

#GAMMA TRANSFER DATA TABLE
#DATA MUST BE 0 <=.255> =
00 10 17 1C 20 24 27 2A 2D 30 32 35 37 3A 3C 3E
40 42 44 46 47 49 4B 4D 4E 50 51 53 54 56 57 59
5A 5C 5D 5E 60 61 62 64 65 66 67 69 6A 6B 6C 6D
6F 70 71 72 73 74 75 76 77 79 7A 7B 7C 7D 7E 7F
80 81 82 83 84 85 86 87 87 88 89 8A 8B 8C 8D 8E
8F 90 91 91 92 93 94 95 96 97 97 98 99 9A 9B 9C
9C 9D 9E 9F A0 A0 A1 A2 A3 A4 A4 A5 A6 A7 A7 A8
A9 AA AA AB AC AD AD AE AF B0 B0 B1 B2 B3 B3 B4
B5 B5 B6 B7 B7 B8 B9 BA BA BB BC BC BD BE BE BF
C0 C0 C1 C2 C2 C3 C4 C4 C5 C6 C6 C7 C7 C8 C9 C9
CA CB CB CC CC CD CE CE CF D0 D0 D1 D1 D2 D3 D3
D4 D4 D5 D6 D6 D7 D7 D8 D9 D9 DA DA DB DC DC DD
DD DE DE DF E0 E0 E1 E1 E2 E2 E3 E4 E4 E5 E5 E6
E6 E7 E7 E8 E9 E9 EA EA EB EB EC EC ED ED EE EE
EF F0 F0 F1 F1 F2 F2 F3 F3 F4 F4 F5 F5 F6 F6 F7
F7 F8 F8 F9 F9 FA FA FB FB FC FC FD FD FE FE FF
```

```
# PRINTER PARAMETER FILE EXAMPLE
# PAPER 0->A4 1->B4
0
# PRINTING DIRECTION 0->PORTRAIT 1->LANDSCAPE
0
# PRINT VOLUME
1
```

IMAGE HANDLING APPARATUS HAVING FILE SYSTEM EMULATION MEANS

This application is a division of application Ser. No. 08/036,028, filed Mar. 23, 1993, (status: pending)

BACKGROUND OF THE INVENTION

1. Field of the Invention

The present invention relates generally to an image handling apparatus, and more particularly to an image scanner and to an image forming apparatus both for transferring data to and from an external host apparatus via an interface.

2. Description of the Prior Art

A computer is generally operatively connected to several peripheral devices such as, for example, a magnetic disc, a magnetic tape, a printer or the like. Recently, a small computer system interface (SCSI) is standardized as an interface means for carrying out high-speed data transfer. Through the standardization, the SCSI is in wide practical use today as an interface for various computers.

By virtue of marked improvement in performance of small computers, e.g. workstations, the development from character codes to bit-map data, which has hitherto been carried out in a printer, tends to be carried out in the computer using outline font data which the computer has. Whereas the technique of developing, for example, fonts to the bit-map data in the computer has advantages in adding other fonts, the use of the SCSI is inevitably required for high-speed data transfer because the quantity of data to be transferred from the computer to the printer is increased.

In applications where an image scanner or an image forming apparatus is connected to an SCSI of a computer employed as a host computer, and parameter setting for such apparatus or image data transfer is carried out by the computer, the computer is required to have a software "device driver" for the apparatus connected thereto.

Because image scanners or image forming apparatus are not standardized in kind of parameters which can be set or in functions, the device driver therefor is not generally contained in an operating system (OS) of the computer. Accordingly, it is necessary to prepare the device driver for the image scanner or the image forming apparatus connected to the host computer.

Under the present conditions discussed above, however, in order to enable a certain image scanner or image forming apparatus to be connected to any one of various types of host computers, it is necessary to prepare a device driver for each type of host computer. As a result, the problem arises that the preparation of the device driver requires much labor and increases costs.

SUMMARY OF THE INVENTION

The present invention has been developed to overcome the above-described disadvantages.

It is accordingly an object of the present invention to provide an improved image handling apparatus, for example an image scanner or an image forming apparatus, which requires no preparation of any new device driver.

In accomplishing the above and other objects, an image scanner according to the present invention comprises means for reading an image, an interface means for connecting the image scanner to an external host apparatus, and a file system emulation means for emulating a file system contained in the external host computer.

When the present invention is applied to an image forming apparatus, the read means is replaced with an image forming means for forming an image on a recording medium.

Because an operating system of a computer constructs a file system in a hard disc, there invariably exists a device driver for the hard disc.

As discussed hereinabove, because the image scanner or image forming apparatus according to the present invention is provided with the file system emulation means, the control of the apparatus or the transfer of image data can be carried out using the device driver for existing hard discs. Furthermore, because the operating system is provided with various commands or system calls which are utilized to access to the file system, development of application software for use in a host computer operatively connected to the image scanner or image forming apparatus is facilitated.

In applications where the image scanner or image forming apparatus according to the present invention is connected to an external host computer, it is not necessary to prepare the device driver for each type of computer if the file system of the computer is the same. In short, the apparatus can be connected to any one of various types of computers having the same file system, e.g. any one of all computers having software called the "UNIX" as an operating system.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein:

FIG. 4 is a programmed file that is read by the computer when parameters are set in;

FIG. 8 is a block diagram of the image forming apparatus of FIG. 7;

FIG. 9 is a programmed file that is read by the computer when parameters are set in.

DETAILED DESCRIPTION OF THE PREFERRED EMBODIMENTS

Figure 1:
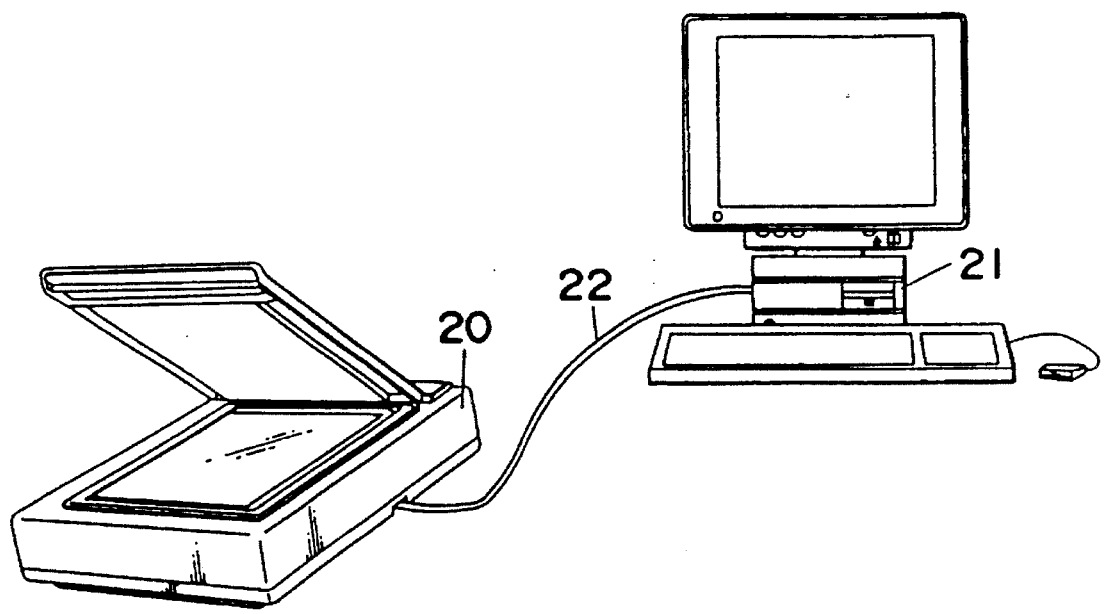
FIG. 1 is a perspective view of an image scanner according to the present invention which is connected to an external host computer.

Referring now to the drawings, there is shown in FIG. 1 an image scanner 20 embodying the present invention. The image scanner 20 is connected to an external host computer via an SCSI bus 22. In FIG. 1, the external host computer is a workstation 21 having the "UNIX" as an operating system. A hard disc in which a file system for the workstation 21 has been formulated is accommodated in the workstation 21 and is connected to the SCSI bus 22 inside the workstation 21.

Figure 2:
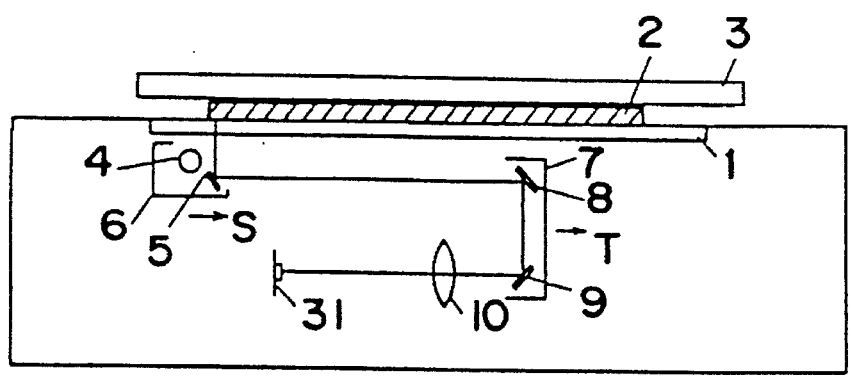
FIG. 2 is a schematic sectional view of the image scanner of FIG. 1.

FIG. 2 schematically depicts the internal construction of the image scanner 20 according to the present invention. The image scanner 20 comprises a document platform 1 made of glass on which a document 2 is to be placed with the image surface thereof directed downwards, a document cover 3 to be overlaid on the document 2 to hold the document 2, and a scanning unit 6 comprising a fluorescent lamp 4 and a reflection mirror 5. The scanning unit 6 is driven by a motor (not shown) and is moved in a direction shown by an arrow S at a constant speed to carry out sub-scanning with respect to the document 2. The image scanner 20 further comprises a half-speed unit 7, a lens 10, and a line-type CCD image sensor 31. The half-speed unit 7 comprises two mirrors 8 and 9. During scanning, when the scanning unit 6 is moved in the direction of the arrow S, the half-speed unit 7 is moved in a direction shown by an arrow T at a speed half of the scanning unit 6. Reflected light from the document 2 is further reflected by the mirrors 5, 8, and 9, and is focused on the CCD image sensor 31 by the lens 10 for image formation. The CCD image sensor 31 carries out main-scanning in the line direction with respect to the reflected light from the document 2 to convert it to an electric signal.

Figure 3:
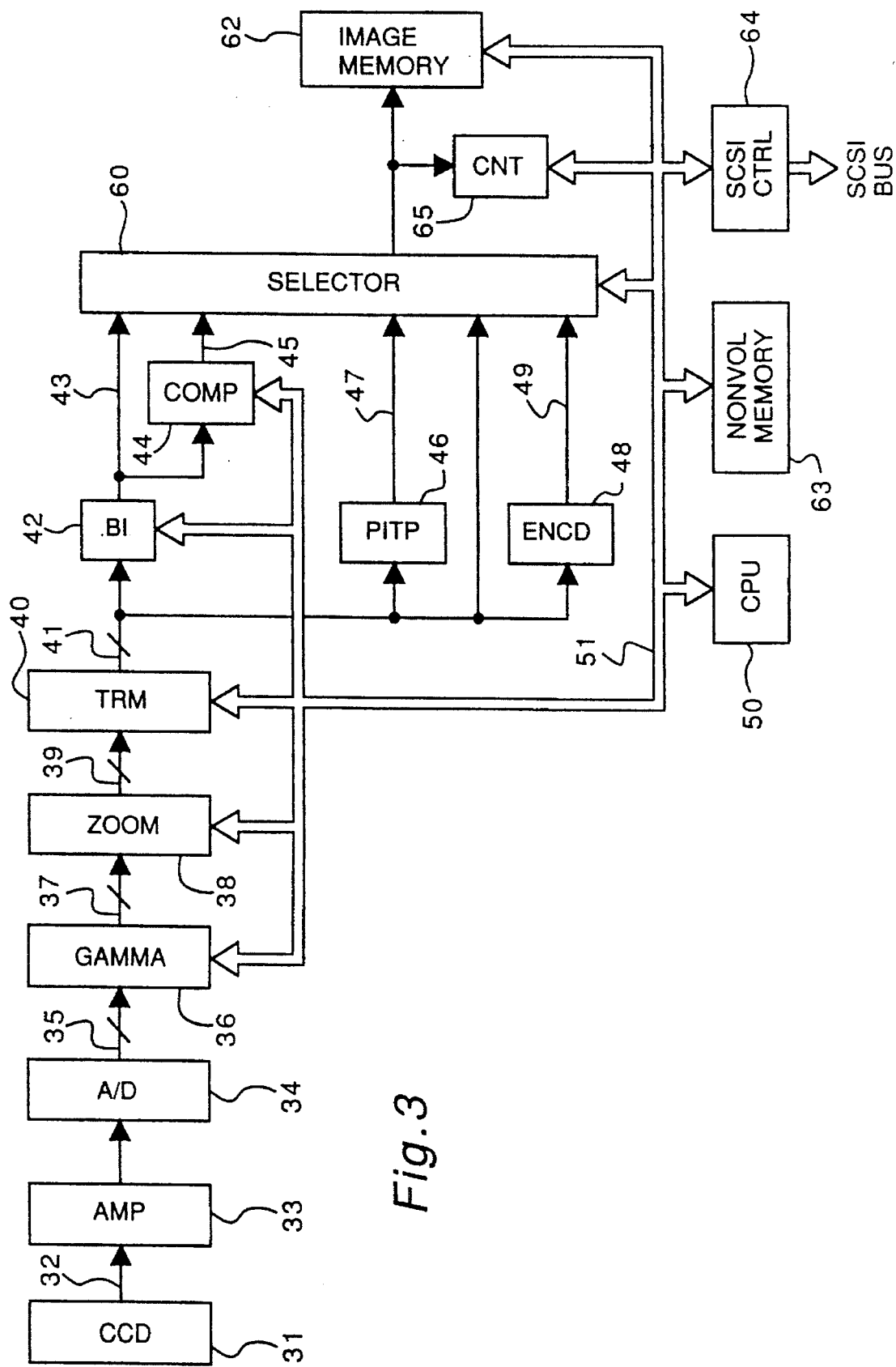
FIG. 3 is a block diagram of the image scanner of FIG. 1.

As shown in FIG. 3, the CCD 31 reads the reflected light from the document 2 at a resolution of 400 dpi, converts it to the electric signal, and outputs an analogue image signal 32. The analogue image signal 32 is then amplified by an amplifier 33 and is converted to a digital image signal 35 by an 8-bit A/D converter 34. A gamma transfer circuit 36 carries out digital-to-digital conversion for conversion of the gradation characteristic, thereby converting the digital image signal 35 to an image signal 37. The gamma transfer circuit 36 is comprised of a look-up table formulated by the use of a RAM. The RAM is connected to a CPU bus 51 of a CPU 50, and data stored therein can be set by the CPU 50. Accordingly, the conversion characteristic of the gamma transfer circuit 36 can be changed by the CPU 50.

A zooming circuit 38 carries out a zooming operation in the direction of main-scanning by interpolating or thinning out the image signal 37, and outputs an image signal 39. The CPU 50 sets the zooming rate of the zooming circuit 38 via the CPU bus 51. The zooming operation in the sub-scanning direction is carried out by changing the speed of movement of the scanning unit 6 shown in FIG. 2. A trimming circuit 40 carries out a trimming operation wherein only part of the image signal 39 that is indicative of a predetermined rectangular region on the document 2 is made effective, and outputs an image signal 41. The trimming circuit 40 is connected to the CPU bus 51 of the CPU 50, and the trimming region can be set by the CPU 50.

A binary circuit 42 compares the image signal 41 with a predetermined threshold value and outputs a binary image signal 43. The threshold value can be set by the CPU 50. A compression circuit 44 encodes and compresses the binary image signal 43 and outputs a compressed binary image signal 45. The compression circuit 44 carries out the encoding using any one of three binary image encoding methods: MH; MR; and MMR. The selection of an appropriate compression method is carried out by the CPU 50. A pseudo-half-tone processor 46 processes the image signal 41 using the error diffusion method and outputs an image signal 47. An encoder 48 encodes and compresses the image signal 41 and outputs an encoded image signal 49.

A selector 60 selects an appropriate signal from among the compressed binary image signal 45, the binary image signal 43, the image signal 47, the image signal 41, and the encoded image signal 49. After the selection, the selector 60 outputs an image signal 61. The appropriate signal selection is carried out by the CPU 50 via the CPU bus 51. An image memory 62 stores the image signal 61 selected by the selector 60. Because the image memory 62 is connected to the CPU bus 51, the image memory 62 is freely accessible from the CPU 50 and an SCSI controller 64. A data counter 65 counts the quantity of image data to be read and that of image date actually stored in the image memory 62. Individual values counted can be read from the CPU 50 via the CPU bus 51.

Data stored in a nonvolatile memory 63 can be read or rewritten by the CPU 50 via the CPU bus 51. The SCSI controller 64 is a controller, controlled by the CPU 50, for carrying out data transfer to and from the external host computer via the SCSI.

The operation of the workstation 21 and the image scanner 20 at the time the image scanner 20 is controlled by the workstation 21 is discussed hereinafter.

The image scanner 20 emulates the file system of the "UNIX" as if it were a hard disc. Accordingly, the image scanner 20 looks like the hard disc from the workstation 21 and can be handled as the hard disc.

The image scanner 20 according to the present invention is controlled by the workstation 21 as follows.

When the image scanner 20 connected to the workstation 21 is operated by the workstation 21 for the first time, the workstation 21 prepares a file system in the image scanner 20, as is the case with the hard disc. In practice, an "mkfs" or "newfs" command of the "UNIX" is executed. At this moment, the operating system provides a device file and a device driver required for operating the hard disc as those required for preparing the file system. The preparation of the file system enables basic information of the file system to be written to a predetermined region, i.e. a super block of the hard disc (image scanner).

In the image scanner 20, the information written to the super block is stored in the nonvolatile memory 63. Thereafter, when a request to read the data stored in the super block is sent from the workstation 21, the image scanner 20 outputs the data stored in the nonvolatile memory 63. Because the information of the super block is stored in the nonvolatile memory 63, even if a power supply to the image scanner 20 is cut off, further preparation of the file system is no longer required.

As discussed above, if the preparation of the file system is carried out with respect to the image scanner 20, the workstation 21 can "mount" the image scanner 20 which emulates the file system, as is the case with the file system of the hard disc. The "mounting" operation is to establish linkage between the file system and device files in the hard disc. After the "mounting" operation, the workstation 21 can access to files contained in the file system prepared in the hard disc. The "mounting" operation is executed using a "mount" command of the "UNIX".

Upon completion of the "mounting" operation, when the file system emulated by the image scanner 20 is viewed from the workstation 21, one file seems to exist therein. This file is a parameter file required to set parameters for the image scanner 20. In order for the image scanner 20 to pretend to contain the parameter file therein, as viewed from the workstation 21, i-node data having information required for the workstation 21 to access to the parameter file are created in the image scanner 20 and are transferred to the workstation 21 according to a request from the workstation 21.

The name of the parameter file is "scan. para". The attribute of the parameter file is "write only". The parameter file is a file required to set the operation mode of the image scanner 20 such as, for example, the zooming ratio, the read area, the gamma transfer characteristic, the binary process or the like, and is represented using a predetermined format.

FIG. 4 depicts one example of the parameter file. Lines starting from "#" are comment lines. The parameters are represented in the following order using numerals.

(1) Read area: upper left coordinates (X, Y); length in the direction of X (XL); and length in the direction of Y (YL), (unit: inch)

(2) Zoom. ratio: zooming ratio in the direction of X (XZ); and zooming ratio in the direction of Y (YZ), (unit: %)

(3) Image process. method: binary process or the presence or absence of the compression process (4) Gamma trans. mode: no transfer when 1; transfer from reflectance to density when 2; and designation of gamma transfer table when 3

(5) γ trans. table: to be represented by hexadecimal numbers

The workstation 21 sets the operation mode of the image scanner 20 by writing the parameter file to the image scanner 20. The writing of the parameter file for the setting of the operation mode of the image scanner 20 can greatly facilitate the setting of the parameters of the image scanner 20.

Because the "UNIX" operating system executes buffering such that data to be read from or written to the file system are temporarily stored in a buffer of a main memory of the workstation, it is necessary to "unmount" the file system in order to actually write the data to the hard disc. A "umount" command of the "UNIX" is used for this purpose.

The image scanner 20 reads a document in accordance with the parameters at the time the parameter file has been written. At this moment, the read image data are stored in the image memory 62 inside the image scanner 20. When the quantity of the image data is greater than the capacity of the image memory 62, the image data as many as the image memory 62 can accommodate are temporarily stored in the image memory 62.

Subsequently, in order for the workstation 21 to read the image data from the image scanner 20, the file system to be emulated by the image scanner 20 is "mounted" again. As viewed from the workstation 21, there seem to exist two files in the file system emulated by the image scanner 20. One of them is the aforementioned parameter file "scan para" whereas the other is an image data file, the name of which is "image. data". The attribute of the image data file is "read only".

In order for the image scanner 20 to pretend to contain the image data file therein, as viewed from the workstation 21, the CPU 50 of the image scanner 20 creates i-node data having information required for the workstation 21 to access to the image data file and transfers them to the workstation 21 in response to a request from the workstation 21. The size of the image data file as viewed from the workstation 21 depends upon the operation mode which has been set in the image scanner 20 by writing to the parameter file. The workstation 21 reads the contents of this data file so that the image data read by the image scanner 20 may be transferred to the workstation 21.

Figure 5:
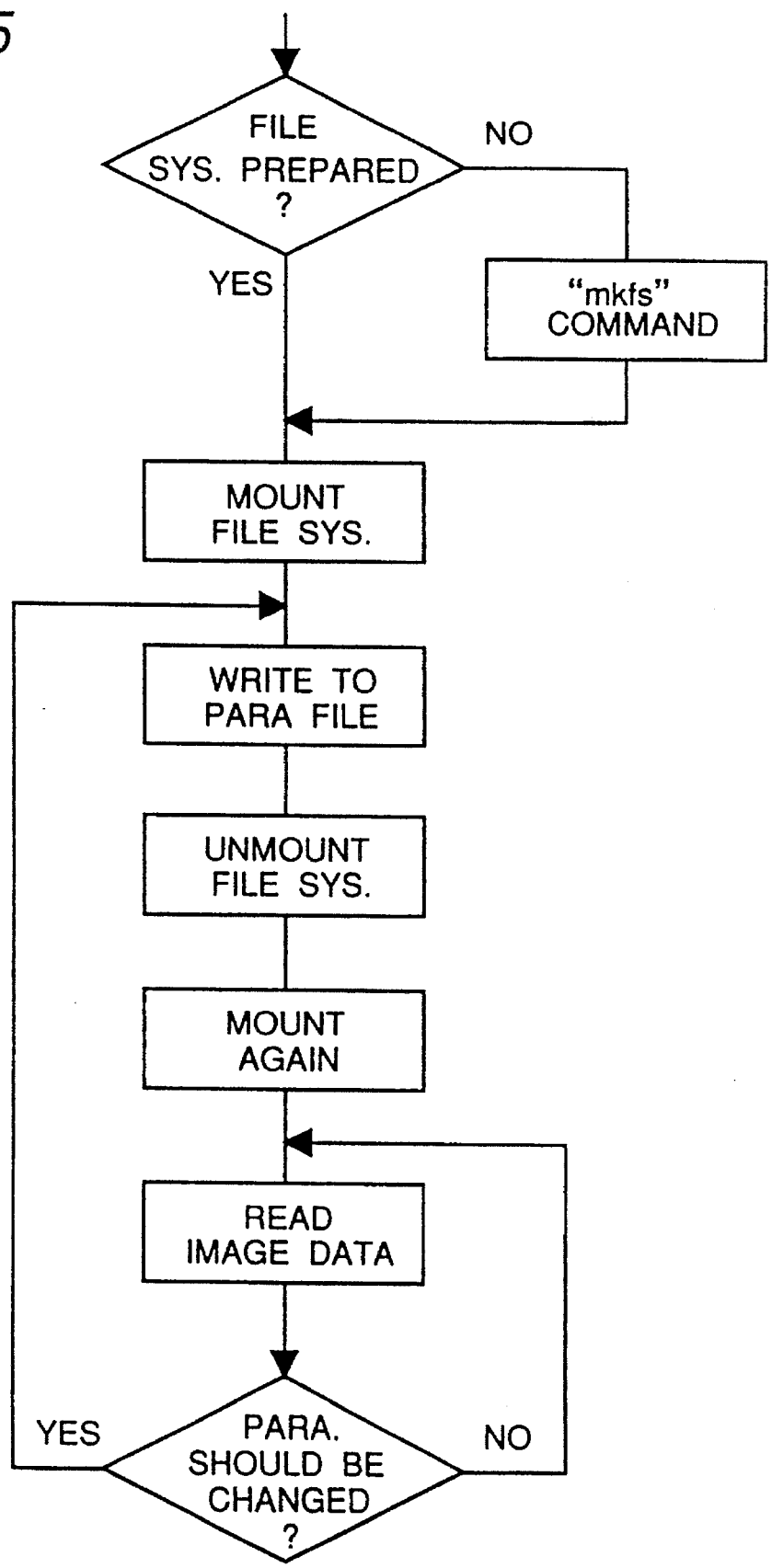
FIG. 5 is a flowchart indicating the procedure at the time the image scanner is controlled by a workstation.

FIG. 5 depicts a flowchart indicating the above-described control procedure at the time the image scanner 20 according to the present invention is controlled by the workstation 21.

The operation of the image scanner 20 is discussed hereinafter in association with the procedure of the workstation 21.

Figure 6:
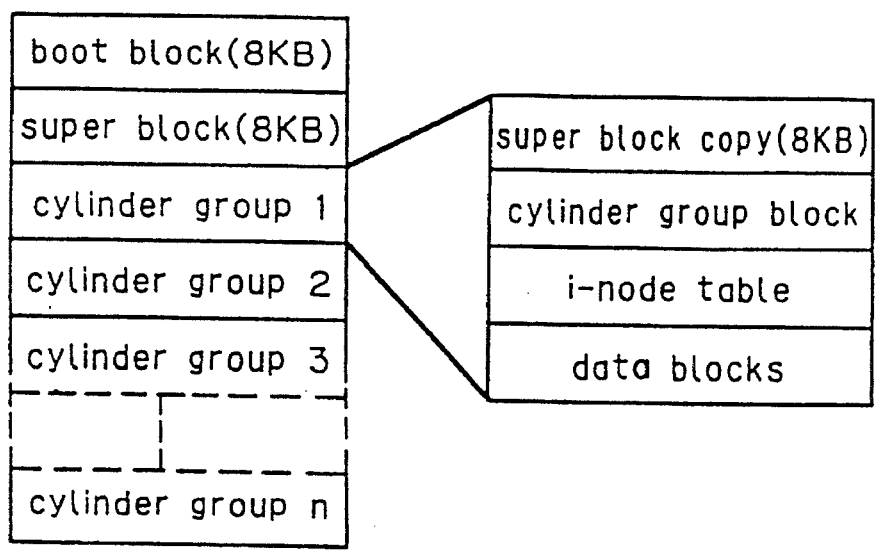
FIG. 6 is a schematic view indicating the layout of a file system contained in the workstation.

FIG. 6 schematically depicts an ordinary layout of the file system of the workstation containing therein the "UNIX" as the OS. First 8 KB of the file system is allocated to a boot block including boot programs required for booting the workstation 21. The next 8 KB is an area called the super block which is generally used to store the then conditions of the file system such as, for example, the number of files, the size of the file system and the like. The super block is followed by a plurality of cylinder groups. Each cylinder group is made up of a copy of the super block, a cylinder group block, an i-node table, and data blocks. Data such as the number of i-nodes, that of the data blocks, an i-node map used, or a map of empty blocks are stored in the cylinder data blocks. The i-node is information indicating the attribute of a file or the location of a data block in which the file exists. Because a directory is also handled as a file, i-nodes are required by the number of files and directories. A predetermined extent is allocated to the area of the i-node table including a plurality of i-nodes at the time the file system is first prepared.

The image scanner 20 which emulates the file system having the "UNIX" and shown in FIG. 6 operates as follows.

The operation at the time the workstation 21 prepares the file system is initially discussed. The file system used herein is a file system to be emulated by the image scanner 20. The workstation 21 writes to the boot block and to the super block positioned at the first 8 KB and at the next 8 KB of the file system, respectively. The CPU 50 of the image scanner 20 stores these 16 KB data in the nonvolatile memory 63. When a data read request for reading the data of these blocks is sent from the workstation 21, the CPU 50 reads the data from the nonvolatile memory 63 and transfers them to the workstation 21. Likewise, when a data write request for writing data into these blocks is sent from the workstation 21, the CPU 50 writes the data to the nonvolatile memory 63.

Thereafter, the workstation 21 writes a copy data of the super block to the first 8 KB of each cylinder block of the file system. At this moment, the CPU 50 can know from the data of the super block, the location of each cylinder in the file system. Accordingly, when the CPU 50 has received the copy data of the super block of the file system from the workstation 21, the CPU 50 discards such data. On the other hand, when a read request is received, the data of the super block are outputted from the nonvolatile memory 63. Alternatively, the data of each copy of the super block may be stored in the nonvolatile memory 63. In this case, when a read request is received, the copy data of the super block are outputted from the nonvolatile memory 63.

Thereafter, the workstation 21 writes to the cylinder group block of each cylinder group. The CPU 50 can know the location and size of the cylinder group block in the file system from the data of the super block. The CPU 50 stores the data of the cylinder group block in the nonvolatile memory 63. When a read request of such data is sent from the workstation 21, the CPU 50 reads the data from the nonvolatile memory 63 and transfers them to the workstation 21. Likewise, when a data write request is sent from the workstation 21, the CPU 50 writes data to the nonvolatile memory 63.

Subsequently, the workstation 21 carries out initialization with respect to the i-node table of each cylinder group. The CPU 50 can know the location and size of the i-node table in the file system from the data of the cylinder group block. The CPU 50 discards data to be written to the i-node table.

When the workstation 21 "mounts" the file system emulated by the image scanner 20, the workstation 21 reads the super block, the cylinder group block, and the i-node table from the file system. When the CPU 50 has received a read request for reading the super block and the cylinder group block, the CPU 50 reads the corresponding data from the nonvolatile memory 63 and transfers them to the workstation 21. The CPU 50 creates a root directory and i-node data of the parameter file "scan. para" and transfers them to the workstation 21.

The CPU 50 knows the location of the data region of the parameter file in the file system from the created i-node data of the parameter file. Accordingly, the CPU 50 can know the writing of the parameter data from the workstation 21 to the parameter file "scan. para". The CPU 50 makes an analysis of the data written to the parameter file, obtains the parameters, and reads the document in accordance with the set operation mode.

The read image data are stored, from the beginning of the image, in the image memory 62 in accordance with a read region set in the parameter file. When the capacity of the image memory 62 is less than the quantity of the image data, a limited quantity of image data corresponding to the capacity of the image memory 62 is stored. The CPU 50 can know from the value of the data counter 65, the quantity of the whole image data to be read, that of the image data stored in the image memory 62, and the region of the image stored in the image memory 62.

After the image reading, when a read request of the i-node table of the file system is sent from the workstation 21, the CPU 50 creates the root directory, the i-node of the parameter file "scan. para", and that of the image data file "image. data", and transfers them to the workstation 21. The size of the image data file is equal to that of the whole image data detected by the data counter 65.

When a read request for reading data located at a certain position in the image data file is sent from the workstation 21, and if the requested data exist in the image memory 62, the CPU 50 transfers such data to the workstation 21 via the SCSI controller 64. If the image memory 62 contains no requested data, the CPU 50 reads a region of the document corresponding to the requested data and stores it in the image memory 62. Thereafter, the CPU 50 takes out the data from the image memory 62 and transfers them to the workstation 21. As described above, because the image scanner 20 has an image memory, it can take full advantage of high-speed data transfer through the SCSI. Furthermore, because the image memory is not necessarily required to have a capacity sufficient to store the entire region to be read, the memory need not have a capacity unduly greater than that necessary.

It is to be noted here that a magnetic storage may be used in place of the nonvolatile memory 63.

Figure 7:
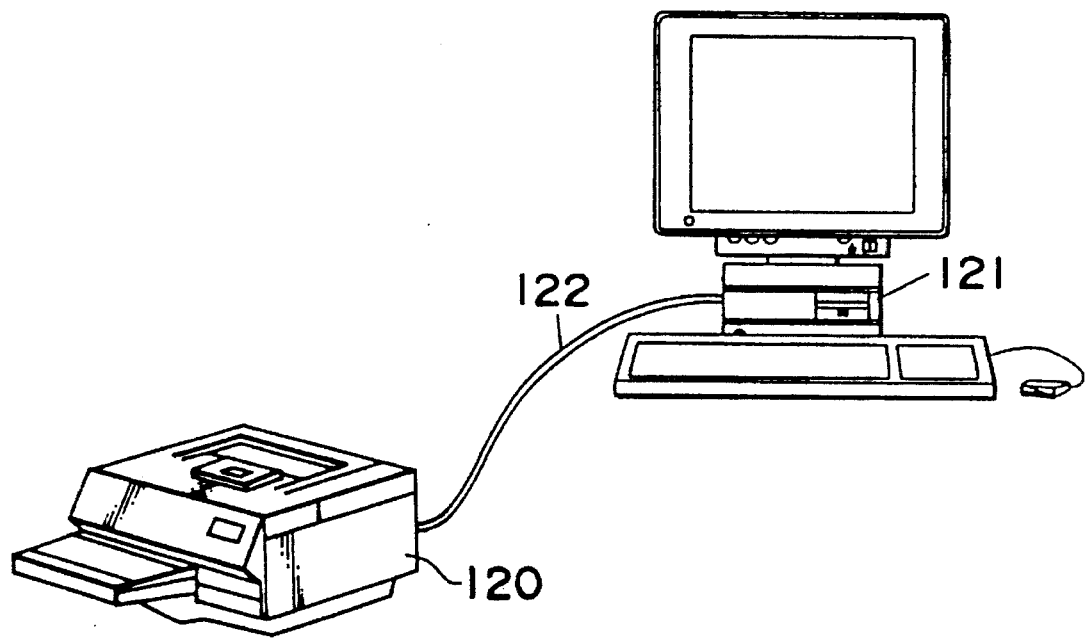
FIG. 7 is a perspective view of an image forming apparatus according to the present invention which is connected to an external host computer.

FIG. 7 depicts an image forming apparatus 120 according to the present invention, which is connected to an external host computer via an SCSI bus 122. The external host computer shown in FIG. 7 is a workstation 121 having the "UNIX" as an operating system. A hard disc in which a file system for the workstation 121 has been formulated is accommodated in the workstation 121 and is connected to the SCSI bus 122 inside the workstation 121.

Figures 8, 9:
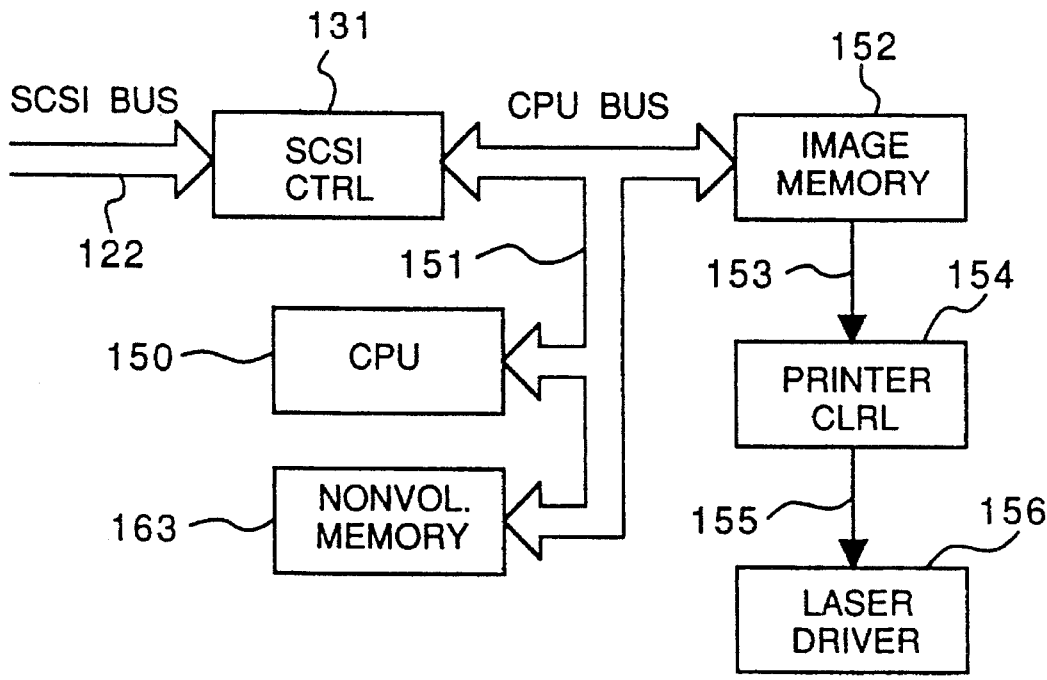

FIG. 8 is a block diagram of the image forming apparatus 120 according to the present invention.

Data stored in a nonvolatile memory 163 can be read or rewritten by a CPU 150 via a CPU bus 151. An SCSI controller 164 carries out data transfer to and from the external host computer via the SCSI and is controlled by the CPU 150.

An image memory 152 stores bit-map image data transferred via the SCSI bus 122 by at least one page. At the time the image data have been stored by one page in the image memory 152, a printer engine (not shown) commences an image forming operation, and image data 153 are outputted from the image memory 152 to a printer engine controller 154 in synchronism with the operation of an image forming unit. The printer engine controller 154 outputs a laser modulation signal 155 to a laser driver 156 based on the image signal 153. Because the image forming unit comprises a conventionally known laser printer employing a semiconductor laser, explanation thereof is omitted.

The operation of the workstation 121 and the image forming apparatus 120 at the time the image forming apparatus 120 is controlled by the workstation 121 is discussed hereinafter.

The image forming apparatus 120 emulates a file system of the "UNIX" as if it were a hard disc. Accordingly, the image forming apparatus 120 looks like the hard disc from the workstation 121 and can be handled as the hard disc.

The image forming apparatus 120 according to the present invention is controlled by the workstation 121 as follows.

When the image forming apparatus 120 connected to the workstation 121 is operated by the workstation 121 for the first time, the workstation 121 prepares a file system in the image forming apparatus 120, as is the case with the hard disc. In practice, an "mkfs" or "newfs" command of the "UNIX" is executed. At this moment, the operating system provides a device file and a device driver required for operating the hard disc as those required for preparing the file system. The preparation of the file system enables basic information of the file system to be written to a predetermined region, i.e. a super block of the hard disc.

In the image forming apparatus 120, the information written to the super block is stored in the nonvolatile memory 163. Thereafter, when a request to read the data stored in the super block is sent from the workstation 121, the image forming apparatus 120 outputs the data stored in the nonvolatile memory 163 to the SCSI bus 122. Because the information of the super block is stored in the. nonvolatile memory 163, even if a power supply to the image forming apparatus 120 is cut off, further preparation of the file system is no longer required.

As discussed above, if the preparation of the file system is carried out with respect to the image forming apparatus 120, the workstation 121 can "mount" the image forming apparatus 120 which emulates the file system, as is the case with the file System of the hard disc.

Upon completion of the "mounting" operation, when the file system emulated by the image forming apparatus 120 is viewed from the workstation 121, one file seems to exist therein. This file is a parameter file required to set parameters for the image forming apparatus 120. In order for the image forming apparatus 120 to pretend to contain the parameter file therein, as viewed from the workstation 121, i-node data having information required for the workstation 121 to access to the parameter file are created in the image forming apparatus 120 and are transferred to the workstation 121 according to a request from the workstation 121.

The name of the parameter file is "printer. para". The attribute of the parameter file is "write only". The parameter file is a file required to set the operation mode of the image forming apparatus 120 such as, for example, the direction of printing (portrait or landscape), the size of recording papers (A4, B4 etc.), the number of prints, or the like, and is represented using a predetermined format.

FIG. 9 depicts one example of the parameter file. Lines starting from "#" are comment lines. The parameters are represented in the following order using numerals.

(1) Size of recording papers to be used
(2) Direction of printing
(3) Number of prints The workstation 121 sets the operation mode of the image forming apparatus 120 by writing the parameter file to the image forming apparatus 120. The writing of the parameter file for the setting of the operation mode of the image forming apparatus 120 can greatly facilitate the setting of the parameters of the image forming apparatus 120.

Because the "UNIX" operating system executes buffering such that data to be read from or written to the file system are temporarily stored in a buffer of a main storage, it is necessary to "unmount" the file system in order to actually write the data to the hard disc.

The image forming apparatus 120 sets the operation mode thereof in accordance with the parameters at the time the parameter file has been written.

Thereafter, in order for the workstation 121 to write the image data to the image forming apparatus 120, the file system to be emulated by the image forming apparatus 120 is "mounted" again. As viewed from the workstation 121, there seem to exist two files in the file system emulated by the image forming apparatus 120. One of them is the aforementioned parameter file "printer. para", whereas the other is an image data file, the name of which is "image. data". The attribute of the image data file is "write only".

In the case where the resolution of the image forming apparatus 120 is chosen to be 300 dpi (84.667 μm/pixel), and the size of recording papers and the direction of printing are A4 and portrait, respectively, the size V of the image data file is given by:

V=int((int(210/0.084667+0.5)+7)/8)xint(297/0.084+0.5)
 =1087480 (bites)

where "int" is a symbol to round down a numeral in parentheses.

In order for the image forming apparatus 120 to pretend to contain the image data file therein, as viewed from the workstation 21, the CPU 150 of the image forming apparatus 120 creates i-node data having information required for the workstation 121 to access to the image data file and transfers them to the workstation 121 in response to a request from the workstation 121. The size of the image data file as viewed from the workstation 121 depends upon the operation mode which has been set in the image forming apparatus 120 by writing to the parameter file. The workstation 121 writes the image data to the image data file so that the image data may be transferred from the workstation 121 to the image forming apparatus 120.

Figure 10:
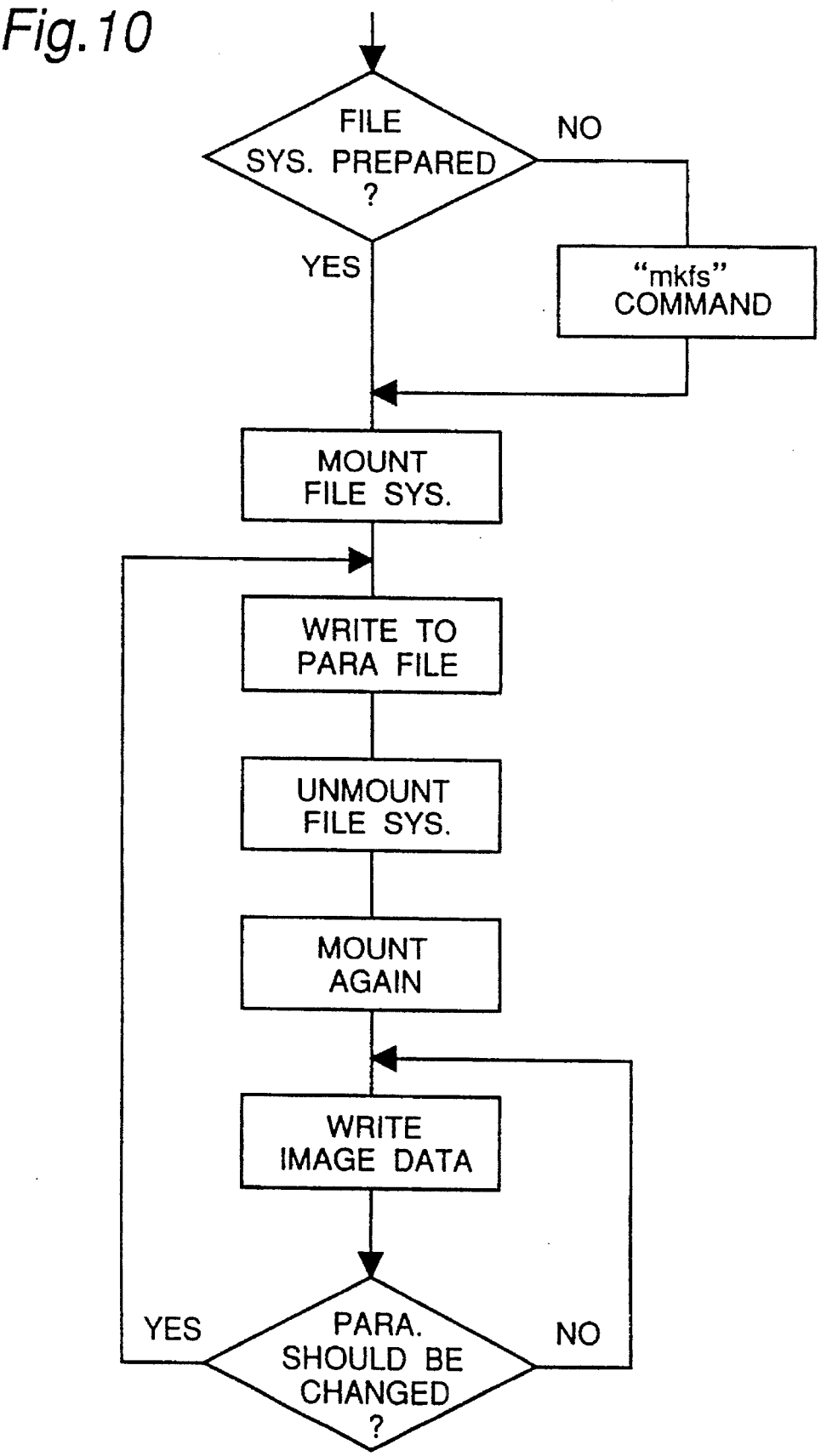
FIG. 10 is a flowchart indicating the procedure at the time the image forming apparatus is controlled by a workstation.

FIG. 10 depicts a flowchart indicating the above-described control procedure at the time the image forming apparatus 120 is controlled by the workstation 121.

The operation of the image forming apparatus 120 is discussed hereinafter in association with the procedure of the workstation 121 with reference to the file system of the "UNIX" shown in FIG. 6.

The operation at the time the workstation 121 prepares the file system is initially discussed. The file system discussed hereinbelow is a file system to be emulated by the image forming apparatus 120. The workstation 121 writes to the boot block and to the super block positioned at the first 8 KB and at the next 8 KB of the file system, respectively. The CPU 150 of the image forming apparatus 120 stores these 16 KB data in the nonvolatile memory 163. When a data read request for reading the data of these blocks is sent from the workstation 121, the CPU 150 reads the data from the nonvolatile memory 163 and transfers them to the workstation 121. Likewise, when a data write request for writing data into these blocks is sent from the workstation 121, the CPU 150 writes the data to the nonvolatile memory 163.

Thereafter, the workstation 121 writes a copy data of the super block to the first 8 KB of each cylinder block of the file system. At this moment, the CPU 150 can know from the data of the super block, the location of each cylinder in the file system. Accordingly, when the CPU 150 has received the copy data of the super block of the file system from the workstation 121, the CPU 150 discards such data. On the other hand, when a read request is received, the data of the super block are outputted from the nonvolatile memory 163. Alternatively, the data of each copy of the super block may be stored in the nonvolatile memory 163. In this case, when a read request is received, the copy data of the super block are outputted from the nonvolatile memory 163.

Thereafter, the workstation 121 writes to the cylinder group block of each cylinder group. The CPU 150 can know the location and size of the cylinder group block in the file system from the data of the super block. The CPU 150 stores the data of the cylinder group block in the nonvolatile memory 163. When a read request of such data is sent from the workstation 121, the CPU 150 reads the data from the nonvolatile memory 163 and transfers them to the workstation 121. Likewise, when a data write request is sent from the workstation 121, the CPU 150 writes data to the nonvolatile memory 163.

Subsequently, the workstation 21 carries out initialization with respect to the i-node table of each cylinder group. The CPU 50 can know,the location and size of the i-node table in the file system from the data of the cylinder group block. The CPU 50 discards data to be written to the i-node table.

When the workstation 121 "mounts" the file system emulated by the image forming apparatus 120, the workstation 121 reads the super block, the cylinder group block, and the i-node table from the file system. When the CPU 150 has received a read request for reading the super block and the cylinder group block, the CPU 150 reads the corresponding data from the nonvolatile memory 163 and transfers them to the workstation 121. The CPU 150 creates a root directory and i-node data of the parameter file "printer. para" and transfers them to the workstation 121.

The CPU 150 knows the location of the data region of the parameter file in the file system from the created i-node data of the parameter file. Accordingly, the CPU 150 can know the writing of the parameter data from the workstation 121 to the parameter file "printer. para". The CPU 150 makes an analysis of the data written to the parameter file, obtains the parameters, and carries out an image forming operation in accordance with the set operation mode.

When a read request of the i-node table of the file system is sent from the workstation 121, the CPU 150 creates the root directory, the i-node of the parameter file "printer. para", and that of the image data file "image. data", and transfers them to the workstation 121. The size of the image data file is determined by the parameters set in the parameter file.

When a data write request for writing data to a certain position in the image data file is sent from the workstation 121, the CPU 150 calculates the address on the image memory from the location on the image file and transfers the image data to the image memory 152 via the SCSI controller 131. Upon completion of the writing of the last one bite of the image data file, the CPU 150 detects that the transfer of the image data has been completed by one page and outputs the image data from the image memory 152 to the printer engine controller 154.

It is to be noted here that although the nonvolatile memory 163 is employed in the image forming apparatus 120, a magnetic storage may be used in place thereof.

As discussed hereinabove, because the image scanner or image forming apparatus according to the present invention is provided with a file system emulation means for emulating a file system, the control of the apparatus or the transfer of image data can be carried out using a device driver for existing hard discs. Furthermore, because the operating system is provided with various commands or system calls which are utilized to access to the file system, development of application software for use in a host computer operatively connected to the image scanner or image forming apparatus is facilitated.

In applications where the image scanner or image forming apparatus according to the present invention is connected to an external host computer, it is not necessary to prepare the device driver for each type of computer if the file system of the computer is the same. In short, the apparatus can be connected to any one of various types of computers having the same file system.

If the image scanner is a full color scanner, or if the image forming apparatus is a full color printer, it is necessary to transfer a large quantity of data, for example 24 bits per 1 pixel, from the external host computer. Even in this case, high-speed data transfer can be carried out using the SCSI.

In addition, the combined use of both of the image scanner and the image forming apparatus according to the present invention provides a copier wherein a copying operation is carried out by copying image data files of the two apparatus.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An image forming apparatus for use with an external host apparatus containing a disk storage apparatus, said image forming apparatus comprising:

means for forming an image;

an interface means for connecting the image forming apparatus to the external host apparatus; and a file system emulation means for:
   (a) emulating a file system contained in the disk storage apparatus of the external host apparatus, and
   (b) making the image forming apparatus look like the disk storage apparatus to the external host apparatus connected to the image forming apparatus to transfer said image from said external host apparatus to said image forming means via said interface means, said file system emulation means comprising a memory means for storing data of a predetermined region of said file system, to which the region basic information of the file system has been written.

2. An image forming apparatus for use with an external host apparatus containing a disk storage apparatus, said image forming apparatus comprising:

means for forming an image;

an interface means for connecting the image forming apparatus to the external host apparatus; and a file system emulation means for:
   (a) emulating a file system contained in the disk storage apparatus of the external host apparatus, and
   (b) making the image forming apparatus look like the disk storage apparatus to the external host apparatus connected to the image forming apparatus to transfer said image from said external host apparatus to said image forming means via said interface means, said file system emulation means comprising a parameter setting means for creating a parameter file required to set an operation mode of the image forming apparatus based on parameter data written to the parameter file from the external host apparatus.

3. An image forming apparatus for use with an external host apparatus containing a disk storage apparatus, said image forming apparatus comprising:

an image forming means for forming an image on a recording medium;

an interface means for connecting the image forming apparatus to the external host apparatus; and a file system emulation means for:
   (a) emulating a file system contained in the disk storage apparatus of the external host apparatus, and
   (b) making the image forming apparatus look like the disk storage apparatus to the external host apparatus connected to the image forming apparatus to transfer said image from said external host apparatus to said image forming means via said interface means.

4. The image forming apparatus according to claim 3, wherein said interface means is a small computer system interface (SCSI).

5. The image forming apparatus according to claim 3, wherein said file system emulation means comprises a memory means for storing data of a predetermined region of the file system, to which region basic information of the file system has been written.

6. The image forming apparatus according to claim 5, wherein said memory means is a nonvolatile memory.

7. The image forming apparatus according to claim 5, wherein said memory means is a magnetic storage.

8. The image forming apparatus according to claim 3, wherein said file system emulation means comprises a parameter setting means for creating a parameter file required to set an operation mode of the image forming apparatus and for setting the operation mode of the image forming apparatus based on parameter data written to the parameter file from the external host apparatus.

9. The image forming apparatus according to claim 8, wherein said file system emulation means creates an image data file of a size determined by the parameter data after the parameter data have been written to the parameter file by the external host apparatus.

10. The image forming apparatus according to claim 9, wherein the external host apparatus writes image data to the image data file so that the image data are transferred from the external host apparatus to the image forming apparatus.

* * * * *